United States Patent
Hoole et al.

(10) Patent No.: US 8,953,588 B2
(45) Date of Patent: Feb. 10, 2015

(54) MOBILE NETWORK WITH PACKET DATA NETWORK BACKHAUL

(75) Inventors: Elliott Hoole, Sammamish, WA (US); Steve McMeekin, Snohomish, WA (US); William M. Stevens, Oroville, WA (US); Donald P. Wahlstrom, Woodinville, WA (US); Yan Zhang, Bellevue, WA (US)

(73) Assignee: Broadcom Corporation, Irvine, CA (US)

( * ) Notice: Subject to any disclaimer, the term of this patent is extended or adjusted under 35 U.S.C. 154(b) by 1118 days.

(21) Appl. No.: 11/516,468

(22) Filed: Sep. 5, 2006

(65) Prior Publication Data

US 2007/0183377 A1   Aug. 9, 2007

Related U.S. Application Data

(60) Provisional application No. 60/765,260, filed on Feb. 3, 2006.

(51) Int. Cl.
*H04L 12/28* (2006.01)
*H04W 92/12* (2009.01)

(52) U.S. Cl.
CPC .................... *H04W 92/12* (2013.01)
USPC ........... 370/389; 370/328; 370/331; 370/338; 370/321; 709/228; 709/236

(58) Field of Classification Search
CPC ..... H04W 12/06; H04W 24/08; H04W 24/02; H04W 36/30; H04W 48/16; H04W 24/76
USPC ............. 455/69, 522, 426.1, 554, 555, 432.1, 455/433, 435.1, 445, 550.1, 560, 561, 411; 370/338, 347, 352, 485, 392, 468, 370/229–332, 389, 400, 415, 417; 709/228, 709/236

See application file for complete search history.

(56) References Cited

U.S. PATENT DOCUMENTS

| | | | |
|---|---|---|---|
| 6,353,605 B1 | 3/2002 | Rautanen et al. | |
| 7,733,793 B1 * | 6/2010 | Brainos et al. | 370/252 |
| 2002/0057662 A1 * | 5/2002 | Lim | 370/338 |
| 2003/0139180 A1 | 7/2003 | McIntosh et al. | |
| 2004/0073797 A1 * | 4/2004 | Fascenda | 713/171 |
| 2005/0043030 A1 | 2/2005 | Shariat et al. | |
| 2005/0068984 A1 * | 3/2005 | Lee et al. | 370/485 |

(Continued)

FOREIGN PATENT DOCUMENTS

| | | |
|---|---|---|
| EP | 1 605 715 A2 | 12/2005 |
| WO | WO 03/094438 A1 | 11/2003 |
| WO | WO 2005/062636 A1 | 7/2005 |

OTHER PUBLICATIONS nanoGSM by ip.access limited, 2005.*

(Continued)

*Primary Examiner* — Babar Sarwar
(74) *Attorney, Agent, or Firm* — Sterne, Kessler, Goldstein & Fox P.L.L.C.

(57) ABSTRACT

Mobile communication data received at the sending based transceiver station via a radio frequency transmission is received a packet data network from a sending base transceiver station. The mobile communication data is forwarded to a base station controller via an interface defined at least in part by a third party base station controller vendor.

23 Claims, 6 Drawing Sheets (56) References Cited

U.S. PATENT DOCUMENTS

| | | | |
|---|---|---|---|
| 2005/0075124 A1 | 4/2005 | Willenegger et al. | |
| 2006/0007919 A1* | 1/2006 | Steinheider et al. | 370/352 |
| 2006/0040656 A1* | 2/2006 | Kotzin | 455/426.2 |
| 2006/0089173 A1* | 4/2006 | Chun | 455/561 |
| 2006/0233135 A1* | 10/2006 | Oswal et al. | 370/331 |
| 2008/0104399 A1* | 5/2008 | Fascenda | 713/168 |

OTHER PUBLICATIONS ip access. product overview: http://www.ipaccess.com/product_overview.html.

ip access. nanoBTS™ : http://www.ipaccess.com/bts.html.

ip access. nanoGSM BSC: http://www.ipaccess.com/bsc.html.

European Search Report in European Patent Application No. EP 06 84 4985, Hoole et al., mailed Nov. 19, 2012.

International Search Report directed toward related International Application No. PCT/US2006/046771, mailed Dec. 10, 2008 from the ISA/US, Alexandria, VA, US; 1 page.

International Preliminary Report on Patentability with Written Opinion issued Jan. 13, 2009 from The International Bureau of WIPO, Geneva, Switzerland; 7 pages.

European Office Action directed at related EP Application No. 06 844 985.9, dated Jun. 25, 2014, European Patent Office, Rijswijk, Netherlands; 6 pages.

\* cited by examiner

MOBILE NETWORK WITH PACKET DATA NETWORK BACKHAUL

CROSS REFERENCE TO OTHER APPLICATIONS

This application claims priority to U.S. Provisional Patent Application No. 60/765,260 entitled MOBILE NETWORK WITH PACKET DATA NETWORK BACKHAUL filed Feb. 3, 2006, which is incorporated herein by reference for all purposes.

BACKGROUND OF THE INVENTION

Traditionally, in mobile telecommunication networks base transceiver stations (BTS) have been deployed to enable mobile devices within the coverage area of a base transceiver station to communicate via the mobile network. Typically each BTS serves a coverage area limited by the range of its transceivers and those of the mobile equipment with which it communicates, and each typically is capable of handling a relatively large volume of traffic. A BTS communicates with the core mobile network via a base station controller (BSC) configured to serve multiple base transceiver stations, e.g., those in a particular geographic area. Traditionally each BTS has been connected to the BSC via a dedicated, high capacity, and relatively costly connection, such as a dedicated T-1 or E-1 line.

In some cases, mobile service providers have not been willing to make the investment that would be required to deploy BTS's in remote (e.g., rural) and/or sparsely populated areas since each would serve only a relatively small number of users yet would still consume the same dedicated communication line and limited BSC resources (e.g., BSC port). Similar obstacles are presented by small enterprises, households, etc., that would like to be able to contract for dedicated, lower capacity access to a mobile network.

An IP network has been used in place of a dedicated E-1/T-1 line to transport mobile network traffic from a lower volume BTS, such as one on a ship, to a mobile network, but typically such solutions have required that a special, dedicated BSC provided by the transport equipment vendor be used, which is undesirable for mobile service providers that already have an installed base of traditional base station controllers and/or for those network/equipment providers who themselves manufacture or sell a BSC.

Therefore, there is a need for a way to connect remote areas and/or smaller numbers of users to a mobile network without requiring a dedicated high capacity line and without requiring that existing BSC equipment be replaced or that a proprietary and dedicated BSC be used.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A mobile network with packet data network backhaul, i.e., one that uses an IP or other packet data network to carry data from a BTS to a BSC, is disclosed. In some embodiments, the BTS is a small scale BTS, such as a small form factor BTS having a relatively small number of transceivers, e.g., one, two, or four transceivers. In some embodiments, the BTS is connected via an IP or other packet data network to an aggregation gateway that acts as a sort of proxy for the BTS, communicating with the BSC on behalf of the BTS using an at least partly proprietary interface, e.g., the Abis interface in the case of GSM, prescribed by a third party OEM vendor of the BSC. In some embodiments, the aggregation gateway acts as a proxy for multiple base transceiver stations, aggregating their associated communications to/from the BSC for receipt/transmission over a single BSC port (or in some embodiments more than one port but fewer than the total number of base transceiver stations served by the aggregation gateway).

Figure 1:
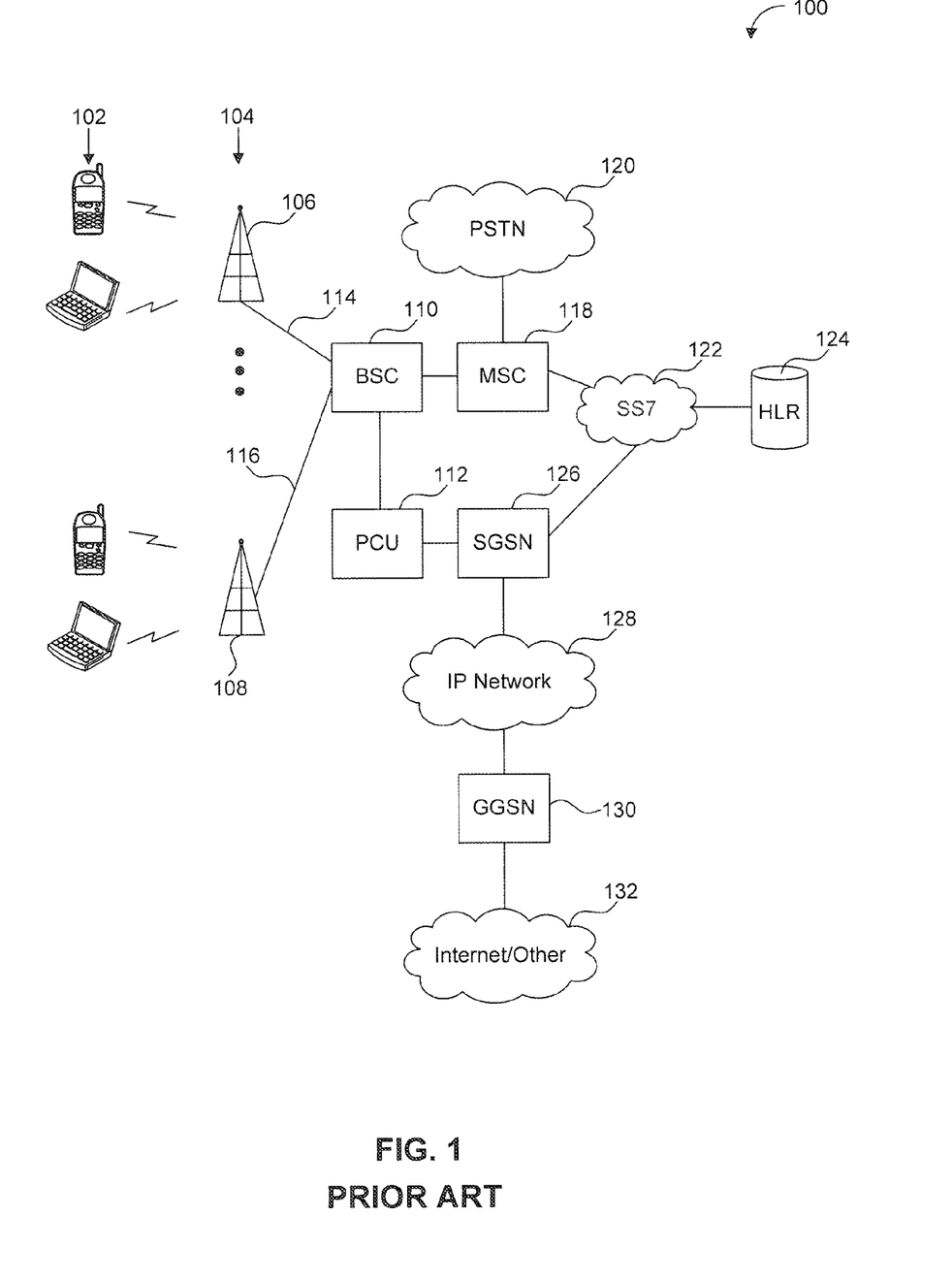
FIG. 1 is a block diagram illustrating elements of a typical GSM network.

FIG. 1 is a block diagram illustrating elements of a typical GSM network. In the example shown, GSM network 100 includes a plurality of mobile devices 102 connected via base transceiver stations 104, represented in FIG. 1 by BTS 106 and BTS 108, to a base station controller (BSC) 110. The BSC 110 has a packet control unit 112 associated with it, for handling non-voice network data communication (e.g., GPRS) packets. The BTS's are connected to the BSC via Abis links 114 and 116, respectively. The Abis interface is a standards-based interface that typically includes one or more elements and/or requirements that are specific and typically proprietary to an original equipment manufacturer (OEM) and/or other vendor of the BSC. Typically, the Abis interface/link is carried over a dedicated and private T-1/E-1 line. In the example shown, the BSC 110 is connected to a mobile switching center 118, to which the BSC 110 is configured to route inbound voice data received from mobile equipment via a BTS and from which the BSC 110 is configured to receive outbound voice data. The MSC 118 connects to traditional telephone equipment and other networks via the public switched telephone network (PSTN) 120. The MSC 118 is connected via an SS7 (or other) network 122 to a home location register (HLR) 124 used to store subscriber data. To handle non-voice packet (e.g., GPRS) data, the PCU 112 is connected to an SGSN 126. In the example shown SGSN 126 is connected via SS7 network 122 to HLR 124. SGSN 126 is also connected via an IP network 128 and a GGSN 130 to the Internet (or other external packet data network) 132.

Figure 2:
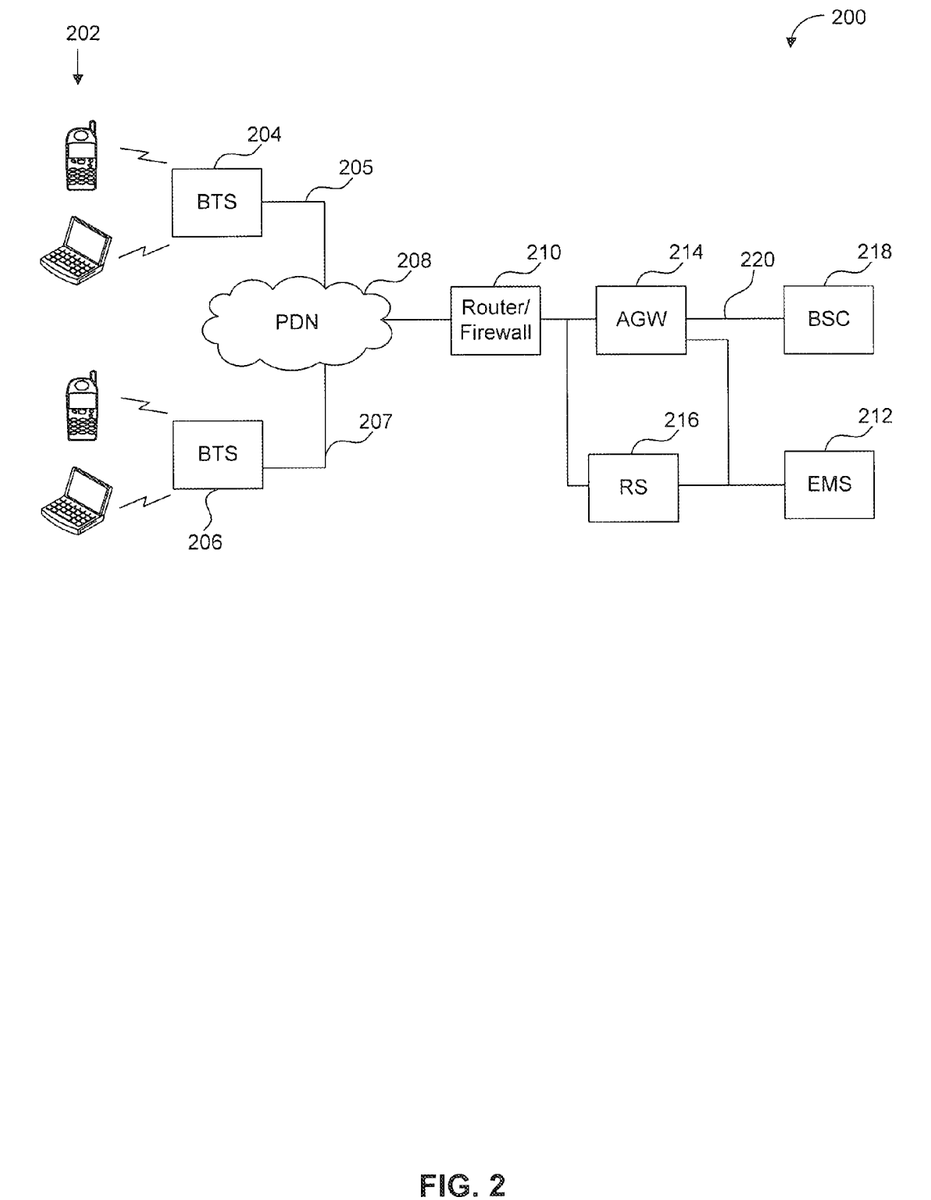
FIG. 2 is a block diagram illustrating an embodiment of a mobile network with packet data network backhaul.

FIG. 2 is a block diagram illustrating an embodiment of a mobile network with packet data network backhaul. In the example shown, the mobile network 200 includes mobile equipment 202 connected to a plurality of base transceiver stations represented in FIG. 2 by BTS 204 and BTS 206. BTS 204 and BTS 206 are connected via a local Internet access connection 205 and 207, respectively, to a packet data network (PDN) 208, such as the Internet. In some embodiments, mobile network data is sent, via PDN 208, between the base transceiver stations represented by BTS 204 and BTS 206, on the one hand, and AGW 214, on the other, using the Internet (IP) protocol. In various embodiments, Internet access connections 205 and 207 comprise a cable, DSL, or other modem collocated with the BTS and/or a local exchange carrier central office (LEC-CO) with DSLAM or cable head-end. Also connected to PDN 208 in the example shown in FIG. 2 is a router/firewall 210 connected to and configured to provide connectivity to and security with respect to an aggregation gateway 214, and a registration server 216. In some embodiments, element management server EMS 212 is connected to router/firewall 210. In some embodiments, router/firewall 210 is omitted and/or does not include a firewall. In various embodiments, element management server 212, an aggregation gateway 214, and a registration server 216 are included in one or more physical computing systems. Element management server 212 enables an administrator to perform operational, administrative, and/or management (OAM) operations with respect to one or more mobile network elements, e.g., BTS 204 or BTS 206. Aggregation gateway (AGW) 214 receives inbound mobile network data (voice, signaling, data, control/management) from one or more base transceiver stations (BTS), via PDN 208, aggregates data from two or more base transceiver stations (if/as applicable), and provides the inbound data to BSC 218 via one or more physical ports, using time division multiplex (TDM) as prescribed by the GSM standard and the BSC OEM's proprietary implementation of the Abis interface 220. In some embodiments, the AGW 214 is capable of interfacing with more than one type of BSC, e.g., with BSC's from two or more vendors. In some such embodiments, the AGW 214 is configured and/or provisioned, e.g., at deployment time, to use the Abis interface API of the particular type of BSC with which it is required to communicate in a particular installation. In some embodiments, an API or other interface specification or definition of the Abis interface as implemented by each BSC vendor/OEM the AGW is desired to be able to support is obtained and used as applicable to configure/provision the AGW to communicate with a particular BSC with which it is required to communicate. In some embodiments, BSC 218 is connected to a PCU, such as PCU 112 of FIG. 1. In some embodiments, AGW 214 is connected to a PCU. For example, BSC 218 is optional, and AGW 214 directly connected to a PCU.

In some embodiments, AGW 214 is configured to present two or more physical base transceiver stations to the BSC as a single logical BTS, to more efficiently use BSC resources in situations in which each BTS serves a relatively small service area and/or number of users. In some embodiments, AGW 214 is configured to map communications received from the BSC to the correct physical BTS and conversely to map communications received from two or more physical base transceiver stations to a single logical BTS prior to forwarding such inbound communications to the BSC.

Registration server 216 is configured to be used to register a BTS and/or other provider equipment with the network, e.g., to authenticate the equipment prior to providing to the equipment session keys to be used in secure communication protocols, identifying (e.g., address) information for other network elements, such as AGW 214, etc. In some embodiments, a physical device, similar to a SIM or other smart card, referred to herein as an equipment identification module (EIM), is provided and installed on a first mobile network equipment, such as a BTS, e.g., at provisioning/configuration time. A secret embodied in the EIM is known to a second equipment associated with the mobile network, e.g., the registration server or other system with which the first mobile network equipment is configured to authenticate itself as part of a registration or similar process, and the first and second equipment use the shared secret to mutually authenticate. Once the first and second equipment have mutually authenticated, in some embodiments the second equipment (e.g., registration server 216) generates and sends to the first equipment via a secure connection a set of keys to be used to send call data securely over the packet data network.

Each BTS in the mobile network 200 shown in FIG. 2 in some embodiments handles only a small fraction of the call volume/load of a conventional BTS, and in such embodiments AGW 214 promotes more efficient use of limited BSC resources. For example, in some embodiments AGW 214 aggregates data associated with multiple base transceiver stations and provides communication to/from the BSC via a fewer number of physical BSC ports (e.g., a single port). In various embodiments, use of PDN 208 and AGW 214 to transport data between base transceiver stations such as BTS 204 and BTS 206, on the one hand, and BSC 218, on the other, makes it commercially feasible to provide a small from factor and/or relatively low capacity BTS for use in remote (e.g., rural) service areas and/or to provide dedicated service to individuals and/or relatively small groups of users, such as a household or small business, since in addition to not requiring a BSC port for each BTS a dedicated T-1/E-1 line is not required.

While the example shown in FIG. 2 and in other embodiments described herein involves a GSM network and/or uses GSM nomenclature to refer to network elements, the techniques described herein are applied in other embodiments to other types of mobile telecommunications networks, and in particular may be applied wherever a plurality of relatively low capacity base transceiver stations need to exchange mobile communication data with a base station controller or other node having a limited number of relatively very high capacity ports or other resources.

Without limiting the generality of the foregoing, the Universal Mobile Telecommunications System (UMTS) is one example of another type of mobile telecommunications network in which the techniques disclosed herein may be applied. In a UMTS network, a W-CDMA air interface (the Uu interface) replaces the GSM air interface shown in FIG. 2.

In UMTS, a mobile user employs a user equipment (UE) to communicate via the air (Uu) interface with a base transceiver called a "node B" in UMTS nomenclature, which in some embodiments would replace the BTS 204 and BTS 206 in FIG. 2 for a UMTS implementation. In such an embodiment, a node B (base transceiver) communicates via a packet-based network (e.g., IP network) with the AGW, which aggregates data associated with multiple nodes B and communicates via a third party/proprietary implementation of an interface to a radio network controller (RNC), the Iub interface, which is the equivalent in a UMTS network to a GSM base station controller (BSC), such as BSC 218 of FIG. 2. As used herein, unless specified otherwise, the term "base transceiver station" is used generically to refer to a transceiver and/or associated equipment configured to communication with a mobile (e.g., user) equipment via an air interface to provide connectivity between the mobile equipment and other elements (e.g., a terrestrial portion) of a radio access network, and includes without limitation a GSM BTS and a UMTS node B. Likewise, as used herein, unless specified otherwise, the term "base station controller" is used generically to refer to a controller configured to connect one or more base transceiver stations to a core mobile network, and includes without limitation a GSM BSC and a UMTS RNC.

In some cases, BSC 110 of FIG. 1 requires signal strength data of mobile devices 102 to be received at a periodic interval rate (e.g., every 480 ms). For example, the signal strength data can be used to determine mobile device communication handover from BTS 106 to BTS 108 if a mobile device moves from an area better covered by BTS 106 to an area better covered by BTS 108. In some embodiments, it is not efficient for a BTS to send signal strength data at the periodic interval rate required by a BSC. For example, it may be inefficient for BTS 204 and BTS 206 of FIG. 2 to send signal strength data over packet data network 208 at the periodic interval rate specified by a BSC. In some embodiments, AGW 214 sends signal strength data to a BSC at a specified periodic interval rate required by the BSC, and BTS 204 and BTS 206 send signal strength data to AGW 214 as needed and/or at an interval other (e.g., less frequently) than the interval required by the BTS. The signal strength data sent by the AGW to the BSC is at least part determined using the signal strength data sent by the BTS to the AGW. In some cases, by having the AGW supply the signal strength data at the interval rate required by the BSC, the BTS can more efficiently control amount of signal strength data sent over the packet data network.

Figure 3:
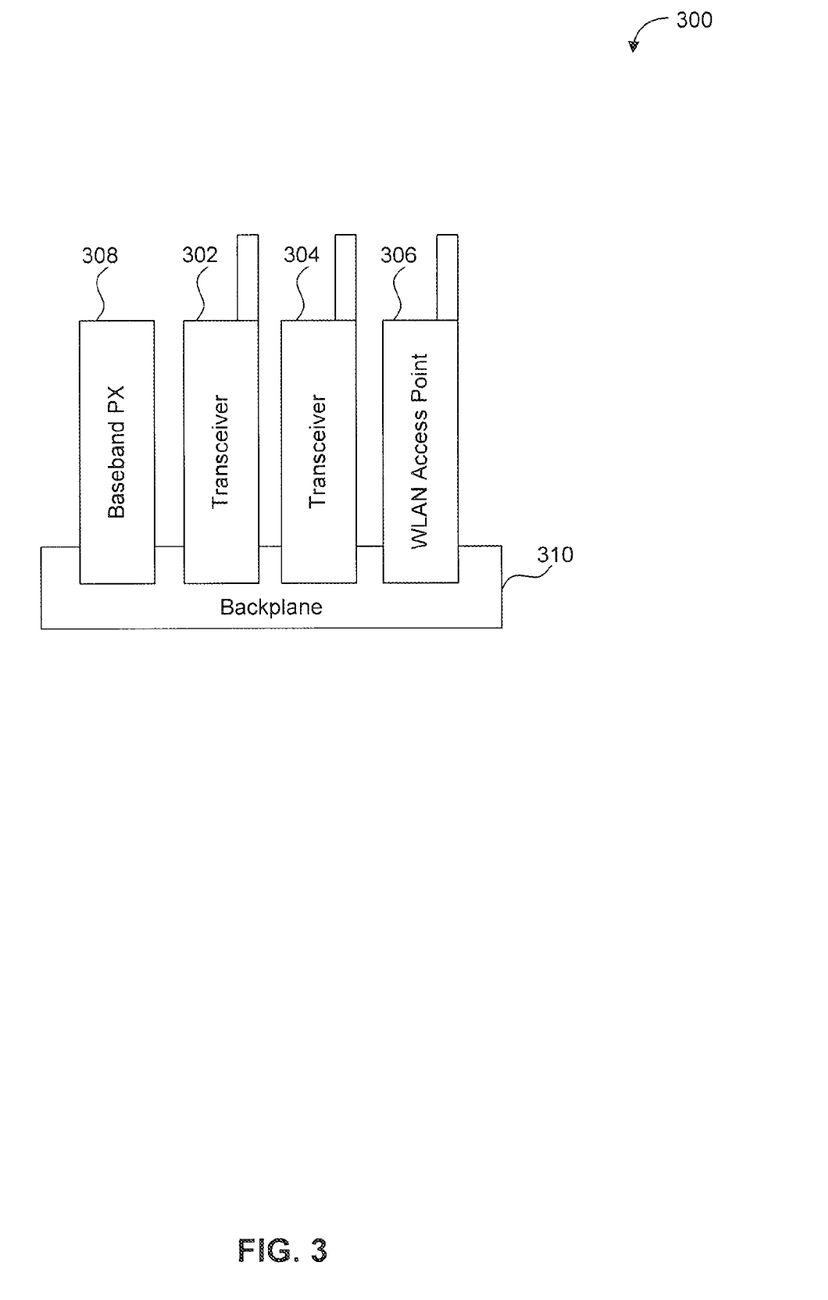
FIG. 3 is a block diagram illustrating an embodiment of a base transceiver station configured to use packet data network backhaul.

FIG. 3 is a block diagram illustrating an embodiment of a base transceiver station configured to use packet data network backhaul. The base transceiver station (BTS) 300 of FIG. 3 is used in some embodiments to implement BTS 204 and BTS 206 of FIG. 2. BTS 300 includes radio transceivers 302 and 304, each configured to communicate at any one time with one or more mobile telephones or other equipment (e.g., up to seven GSM handsets) using a single assigned frequency. BTS 300 also includes a 802.11b/g wireless local area network (WLAN) access point 306 configured to communicate with one or more mobile IP devices, such as one or more laptop computers, personal digital assistants, and/or other devices configured to communicate via WLAN. A base-band processor component 308 is configured to perform base-band processing for transceivers 302 and 304 (e.g., GSM layer 1). In various embodiments, base-band processor component 308 also performs security and IP network tunneling/transport functions, packet timing, and Abis interface (layer 2 and 3) processing. In the example shown, transceivers 302 and 304, WLAN access point 306, and base-band processor component 308 communicate via an Ethernet backplane 310. In some embodiments, components 302-308 are modular components that slide into backplane 310, which in some embodiments is itself mounted in a chassis or frame configured to contain and protect, e.g., by physical contact, the elements, etc., the components of BTS 300. In some embodiments, more than four slots are available. In various embodiments, the transceiver/access point components inserted into the backplane 310 may be mixed and matched to achieve a desired configuration, e.g., by including more or fewer transceivers, access points, etc.

Figure 4:
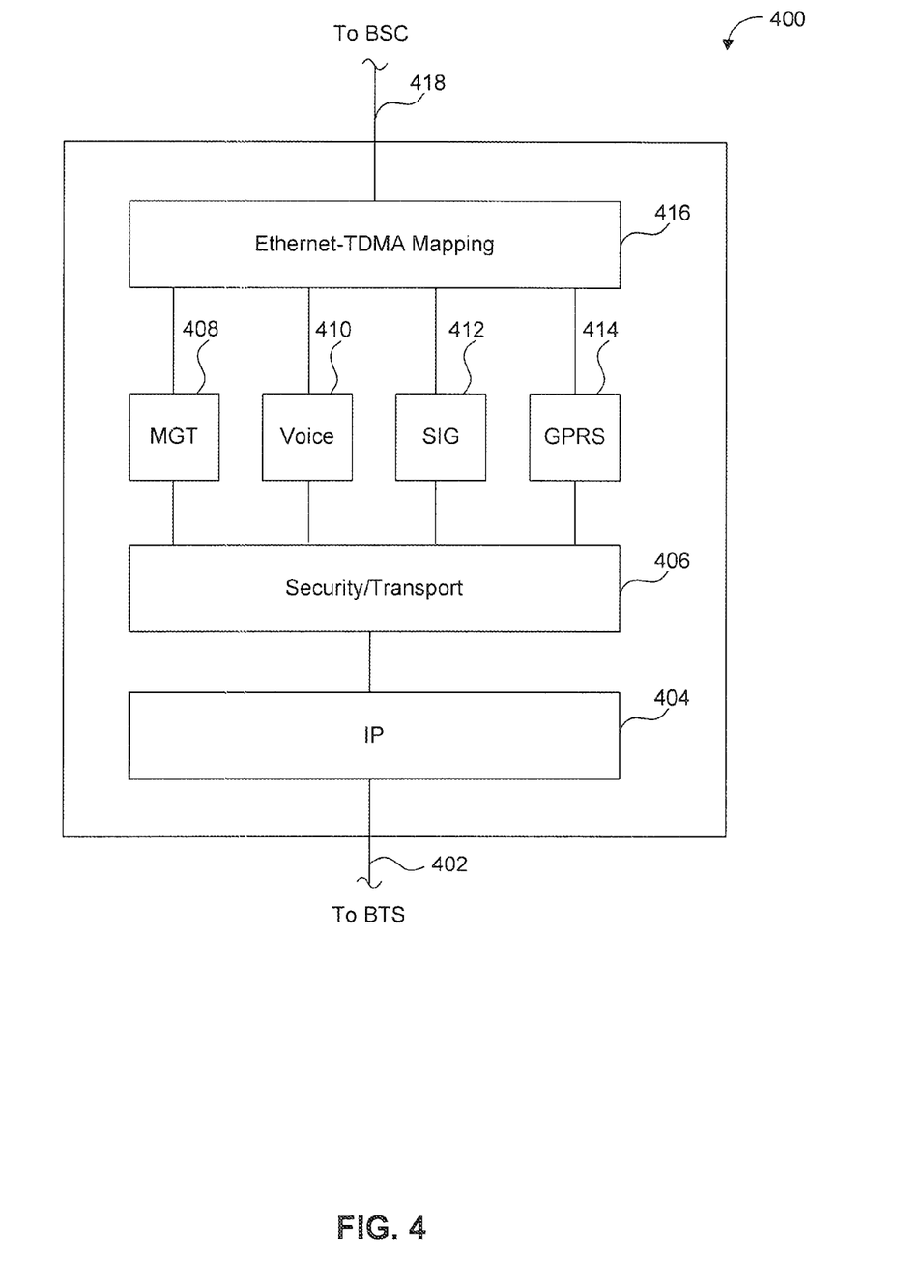
FIG. 4 is a block diagram illustrating an embodiment of an aggregation gateway, such as aggregation gateway 214 of FIG. 2.

FIG. 4 is a block diagram illustrating an embodiment of an aggregation gateway, such as aggregation gateway 214 of FIG. 2. In the example shown, aggregation gateway 400 is connected to one or more base transceiver stations via an IP network connection 402. An IP network layer 404 facilitates communication between AGW 400 and one or more BTS via the IP protocol. For packets received from a BTS, IP network layer 404 extracts (removes) and parses IP header information and passes packets to security/transport layer 406. Security/transport layer 406 decrypts data received from a BTS and removes and parses security/transport protocol data from received packets. Depending on the nature (type) of a received packet, it is processed by a corresponding one of the following modules: BTS control/administrative function module 408, voice data processing module 410, GSM (or other) signaling data processing module 412, and GPRS (or other) packet data processing module 414. In various embodiments, the processing performed by the applicable one(s) of modules 408-414 includes any OEM-specific processing required to communicate with the BSC under the OEM's proprietary implementation of the Abis or other applicable interface (e.g., Iub). Data processed by components 408-414 is passed to an Ethernet-TDMA mapping module 416 configured to map data to the appropriate TDMA slot for transmission via Abis (or other applicable, e.g., Iub) interface 418 to the BSC. Data received from the BSC is processed in reverse order. Ethernet-TDMA mapping module 416 receives TDMA data via the Abis interface 418 and associates identifying (e.g., slot/channel) data with the corresponding data from each TDMA slot. Outbound data is routed to and processed by the appropriate one of components 408-414, depending on the data type, and then sent to security/transport layer 406 (e.g., to be encrypted, signed, and prepared for transport) and IP layer 404 (e.g., to have a properly formed IP header addressed to an IP address associated with the destination BTS(s)) prior to being sent via IP network connection 402 and the intervening IP network to the destination BTS.

In some embodiments, voice data for multiple calls (e.g., multiple TDM slots in the case of a GSM or other TDMA network) is bundled into a single RTP—real-time transport protocol (or similar) packet, under a single RTP (or other protocol) header. On the receiving end, the RTP (or other) packet payload is parsed to identify and extract the call data for each call. In some embodiments, information included in the RTP (or other) header is used to parse the payload. In some embodiments, each portion of the payload includes a header containing data identifying the call/slot with which it is associated, a sequence number or data indicating how the data is to be used, and/or other information.

Figure 5:
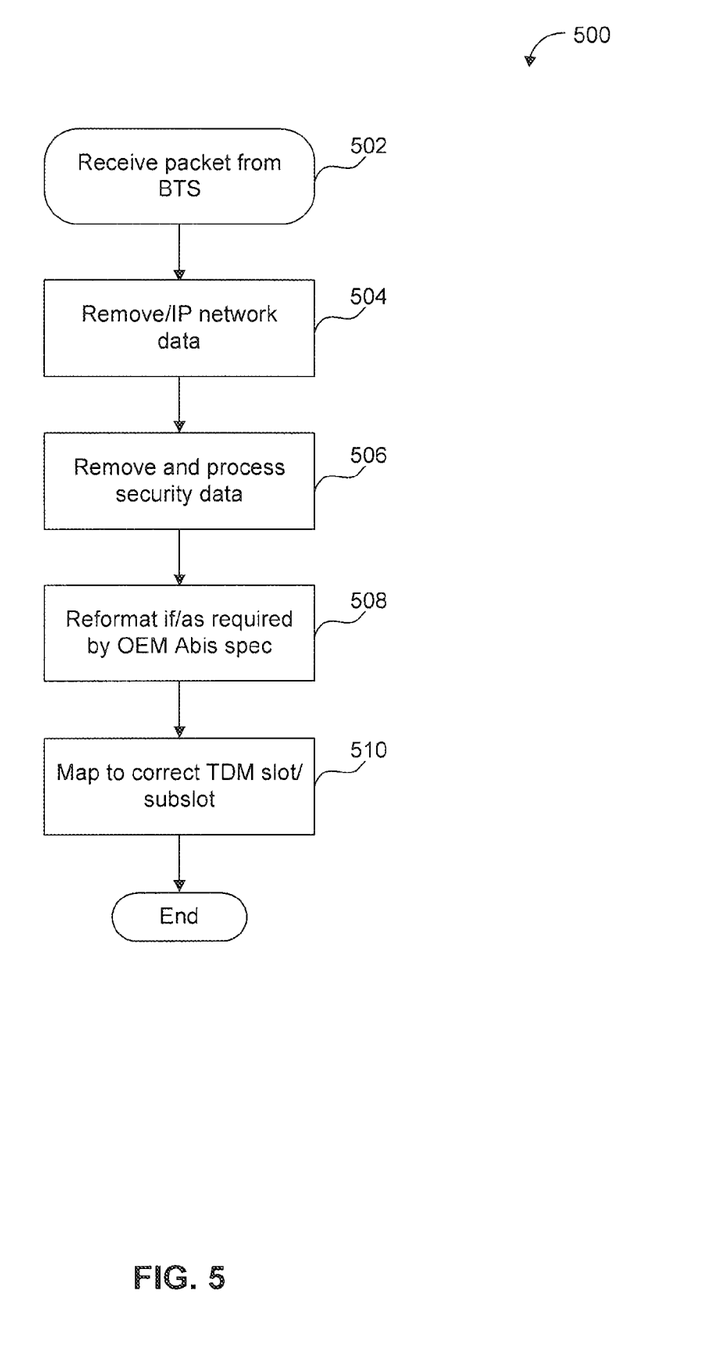
FIG. 5 is a flow chart illustrating an embodiment of a process for processing data received from a BTS via a packet data network.

FIG. 5 is a flow chart illustrating an embodiment of a process for processing data received from a BTS via a packet data network. In some embodiments, the process of FIG. 5 is implemented on an aggregation gateway. Upon receipt of a data packet from a BTS (502), e.g., via an IP network, the IP/other network data (e.g., header) is parsed and removed (504) and similarly security and transport protocol data is parsed/processed (e.g., data decrypted, signature used to authenticate and/or verify data integrity) and removed (506). The data is reformatted and/or otherwise processed if/as required by the BSC OEM's proprietary implementation of the Abis (or other) interface (e.g., OEM's typically have proprietary formats/requirements for BTS control/management function, GPRS packets, etc.) (508). The formatted data is then mapped to the correct TDM slot or sub-slot (510) for transmission to the BSC via the Abis (or other, e.g., Iub) interface.

Figure 6:
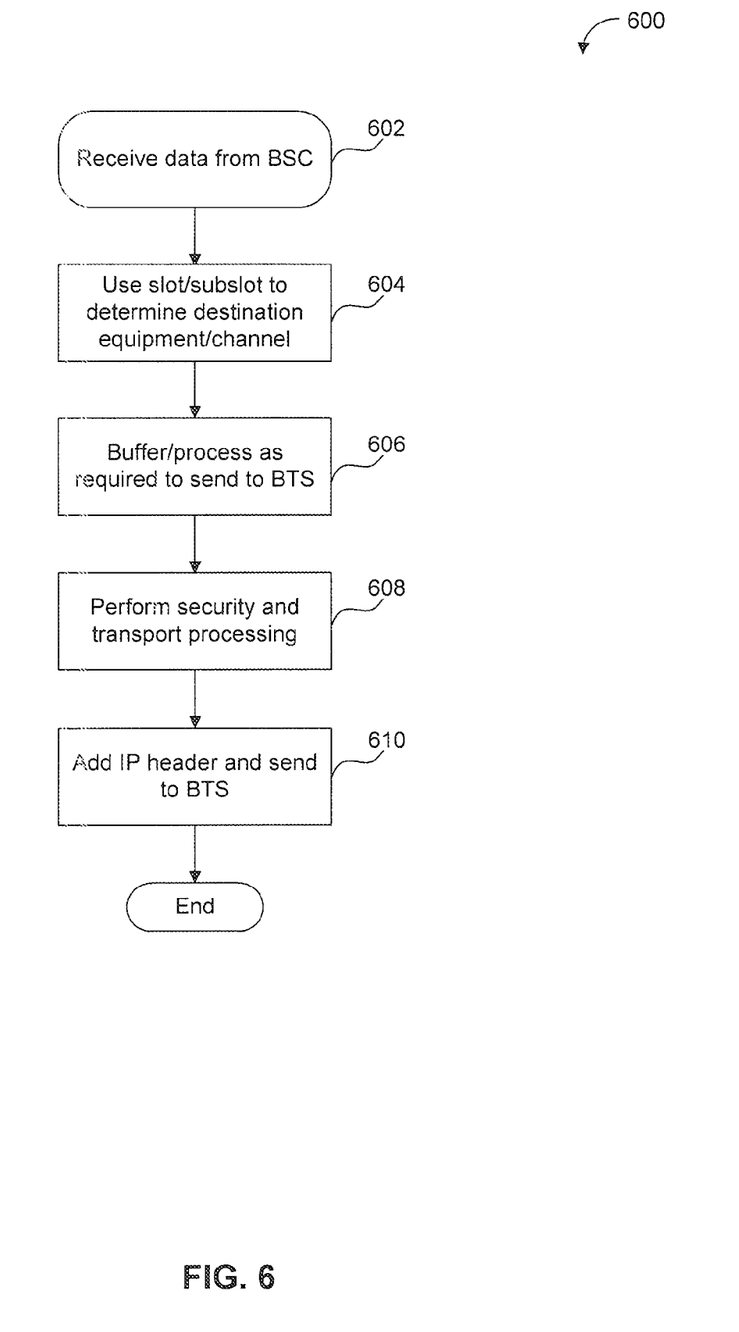
FIG. 6 is a flow chart illustrating an embodiment of a process for processing data received from a BSC for transmission to a BTS via a packet data network.

FIG. 6 is a flow chart illustrating an embodiment of a process for processing data received from a BSC for transmission to a BTS via a packet data network. In some embodiments, the process of FIG. 6 is implemented on an aggregation gateway. Upon receipt of data from the BSC (602), the slot/sub-slot information is used to determine the destination equipment/channel for the data (604). Data is buffered and/or processed (e.g., reformatted) as required to send it to the BTS (606). Security (e.g., encryption) and transport protocol processing are performed (608). An IP header is added and used to send the data via an IP network to the BTS (610).

In some embodiments, a jitter management buffer is provided. Call data packets or frames are not pulled from the buffer until it has reached a prescribed minimum depth and/or a prescribed length of time. In some embodiments, the buffer is not filled beyond a prescribed maximum depth, to avoid accumulating network transport delays. As packets are received they are placed in the buffer, in sequence, if there is room, or if the buffer is full either one or more received packets are dropped instead of being added to the buffer (e.g., if they arrived too early or too late) or one or more packets in the buffer are purged (e.g., if they were received more than a prescribed amount of time ago and/or a subsequently received packet is neither too late nor too early). By enforcing a maximum depth and only beginning (or in some embodiments resuming after buffer depletion) transmission after the buffer has filled to a minimum depth/reached a prescribed time, network jitter is managed without introducing an undesirable amount of delay in the receipt of call data at the destination equipment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of mobile communication by a network device, the method comprising:
   receiving, via a packet data network from a base transceiver station, a first real time transport protocol (RTP) packet, wherein the first RTP packet comprises mobile communication data received at the base transceiver station via two or more radio frequency transmissions;
   unbundling, from the first RTP packet, a first frame of voice data from a first call;
   unbundling, from the first RTP packet, a second frame of voice data from another call; and
   forwarding the first and second frames of voice data to a base station controller.

2. The method according to claim 1, wherein the base transceiver station comprises one or more of the following: a GSM network base transceiver station (BTS) and a UMTS network node B.

3. The method according to claim 1, wherein the base station controller comprises one or more of the following: a GSM network base station controller (BSC) and a UMTS network radio network controller (RNC).

4. The method according to claim 1, wherein forwarding the first and second frames of voice data includes aggregating data from a plurality of base transceiver stations.

5. The method according to claim 4, wherein forwarding the first and second frames of voice data includes presenting the aggregated data to the base station controller as data associated with a single logical base transceiver station.

6. The method according to claim 4, wherein aggregating the data from the plurality of base transceiver stations includes time division multiplexing the data from the plurality of base transceiver stations.

7. The method according to claim 1, wherein the two or more radio frequency transmissions are associated with one or more of the following: a GSM wireless network, a PCS wireless network, and an IDEM wireless network.

8. The method according to claim 1, wherein the first and second frames of voice data are sent by the base transceiver station using a key that enables secure communication over the packet data network.

9. The method according to claim 8, wherein the key is obtained from a registration entity, and the base transceiver station registers with the registration entity using a secret data that is known to the registration entity and to a physical device associated with the base transceiver station, and the secret data is embodied in the physical device in a manner that prevents the secret data from being obtained from the physical device without destroying the ability of the physical device to be used to register the base transceiver station with the registration entity.

10. The method according to claim 9, wherein the physical device comprises a smart card.

11. The method according to claim 1, wherein the base transceiver station includes a wireless local area network access point and a cellular wireless transceiver.

12. The method according to claim 1, wherein the base transceiver station includes modular components connected together by an Ethernet backplane.

13. The method according to claim 1, wherein the packet data network comprises one or more of the following: a public network, the Internet, a private network, a wired packet data network, or a wireless packet data network.

14. The method according to claim 1, wherein the network device is configured to aggregate different types of mobile communication data from a plurality of base transceiver stations before forwarding the aggregated different types of mobile communication data from the plurality of base transceiver stations.

15. The method according to claim 14, wherein the network device acts as a proxy for the plurality of base transceiver stations, wherein the network device presents the plurality of base transceiver stations as a single logical base transceiver station to the base station controller.

16. A system comprising:
   a first communication interface configured to receive, via a packet data network from a base transceiver station, a first real time transport protocol (RTP) packet, wherein the first RTP packet comprises mobile communication data received at the base transceiver station via two or more radio frequency transmissions;
   a processor configured to unbundle a first frame of voice data from a first call from the first RTP packet, and to unbundle a second frame of voice data from another call from the first RTP packet; and
   a second communication interface configured to forward the first and second frames of voice data to a base station controller.

17. The system according to claim 16, wherein the second communication interface comprises an Abis interface.

18. The system according to claim 16, wherein the second communication interface is defined by a third party base station controller vendor.

19. The system according to claim 16, wherein the first and second communication interfaces and the processor are part of a network device, and wherein the network device is configured to aggregate different types of mobile communication data from a plurality of base transceiver stations.

20. The system according to claim 19, wherein the network device acts as a proxy for the plurality of base transceiver stations, and wherein the network device presents the plurality of base transceiver stations as a single logical base transceiver station to the base station controller.

21. The system according to claim 19, further comprising an element management server that is interfaced with the network device, wherein the element management server enables operational, administrative and management operations with respect to the base transceiver station.

22. The system according to claim 21, wherein the network device is disposed between the element management server and the Internet.

23. The system according to claim 19, wherein a firewall device is disposed between (1) the Internet and (2) the network device.

* * * * *

UNITED STATES PATENT AND TRADEMARK OFFICE
CERTIFICATE OF CORRECTION

PATENT NO.         : 8,953,588 B2
APPLICATION NO.    : 11/516468
DATED              : February 10, 2015
INVENTOR(S)        : Hoole et al.

It is certified that error appears in the above-identified patent and that said Letters Patent is hereby corrected as shown below:

In the Claims

Column 8, line 15, please replace "IDEM" with --IDEN--.

Signed and Sealed this
Fourteenth Day of July, 2015

Michelle K. Lee
*Director of the United States Patent and Trademark Office*